US012220717B2

(12) United States Patent
Hacibekir et al.

(10) Patent No.: US 12,220,717 B2
(45) Date of Patent: Feb. 11, 2025

(54) FLUID ATOMIZER WITH HELICAL INLET CHANNEL

(71) Applicants: FORD OTOMOTIV SANAYI A.S., Istanbul (TR); OZYEGIN UNIVERSITESI, Istanbul (TR)

(72) Inventors: Tahsin Hacibekir, Istanbul (TR); Ismail Hakki Savci, Istanbul (TR); Ozan Ekin Nural, Istanbul (TR); Ozkan Bebek, Istanbul (TR); Ozgur Ertunc, Istanbul (TR)

(73) Assignees: FORD OTOMOTIV SANAYI A.S., Istanbul (TR); OZYEGIN UNIVERSITESI, Istanbul (TR)

( * ) Notice: Subject to any disclaimer, the term of this patent is extended or adjusted under 35 U.S.C. 154(b) by 259 days.

(21) Appl. No.: 17/920,415

(22) PCT Filed: Apr. 21, 2021

(86) PCT No.: PCT/TR2021/050370
§ 371 (c)(1),
(2) Date: Oct. 21, 2022

(87) PCT Pub. No.: WO2021/216025
PCT Pub. Date: Oct. 28, 2021

(65) Prior Publication Data

US 2023/0148142 A1 May 11, 2023

(30) Foreign Application Priority Data

Apr. 21, 2020 (TR) ................................ 2020/06305

(51) Int. Cl.
*B05B 1/34* (2006.01)
*B05B 1/06* (2006.01)

(52) U.S. Cl.
CPC .............. *B05B 1/3426* (2013.01); *B05B 1/06* (2013.01); *B05B 1/3489* (2013.01); *F01N 2610/1453* (2013.01)

(58) Field of Classification Search
CPC ....... B05B 1/3426; B05B 1/06; B05B 1/3489; F01N 2610/1453; F01N 2610/01;
(Continued)

(56) References Cited

U.S. PATENT DOCUMENTS 6,289,676 B1 * 9/2001 Prociw ................. F23D 11/383 60/740
2004/0178287 A1 9/2004 Okamoto et al.
(Continued)

FOREIGN PATENT DOCUMENTS

CN 205495878 U 8/2016
EP 1090256 A1 4/2001
(Continued)

*Primary Examiner* — Brandon D Lee
(74) *Attorney, Agent, or Firm* — Bayramoglu Law Offices LLC

(57) ABSTRACT

A fluid atomizer with helical inlet channel which is used to atomize the fluid and convert the same into a spray of droplets, contains fluid inlet which are two independent chambers through which the flow passes and swirl chamber, transforms the fluid into spray dispersion by atomizing the same after the fluid is collected in the center after centrally coming fluid is dispersed by forming a swirl.

20 Claims, 3 Drawing Sheets

Figure 1:
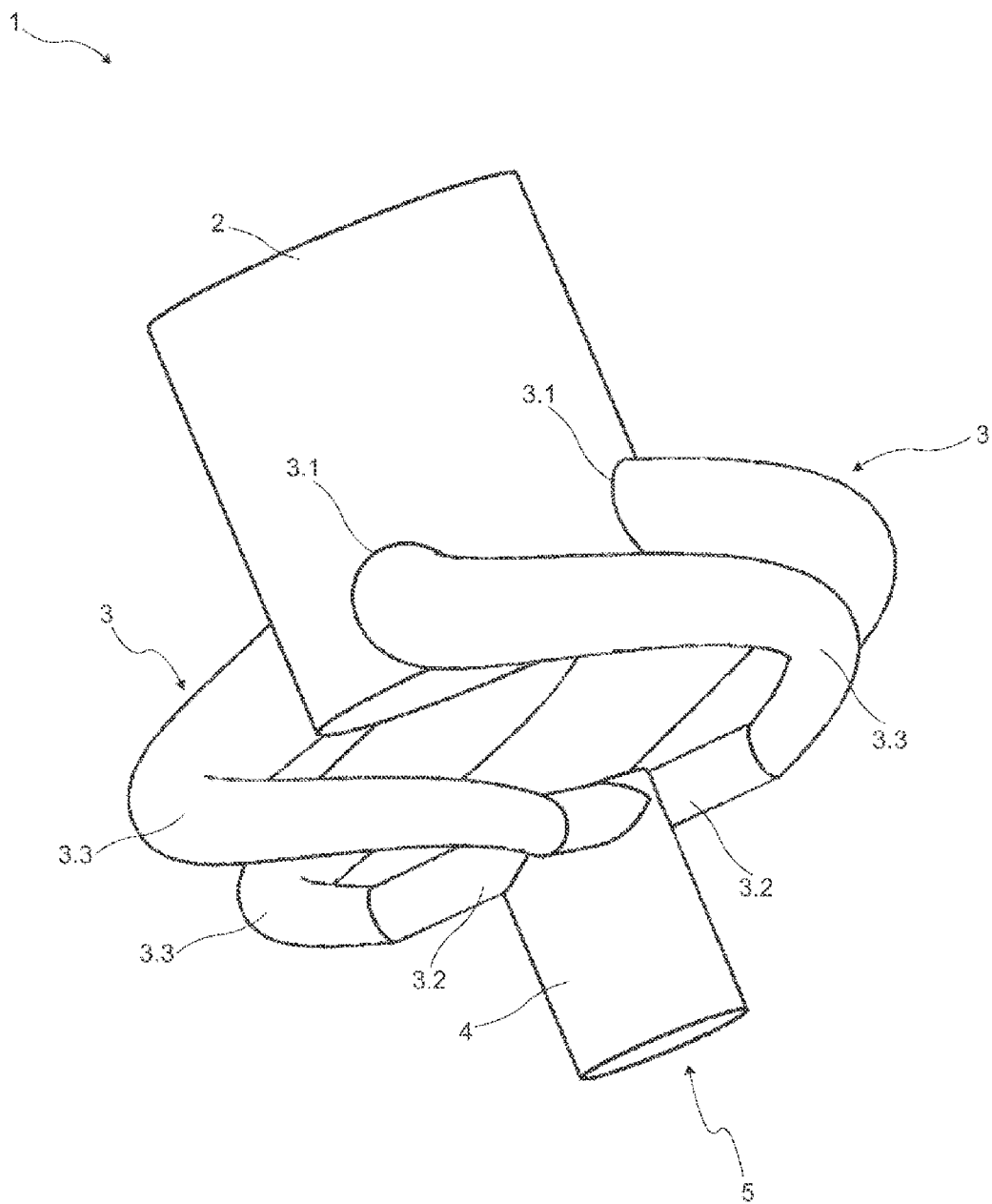
Figure 2:
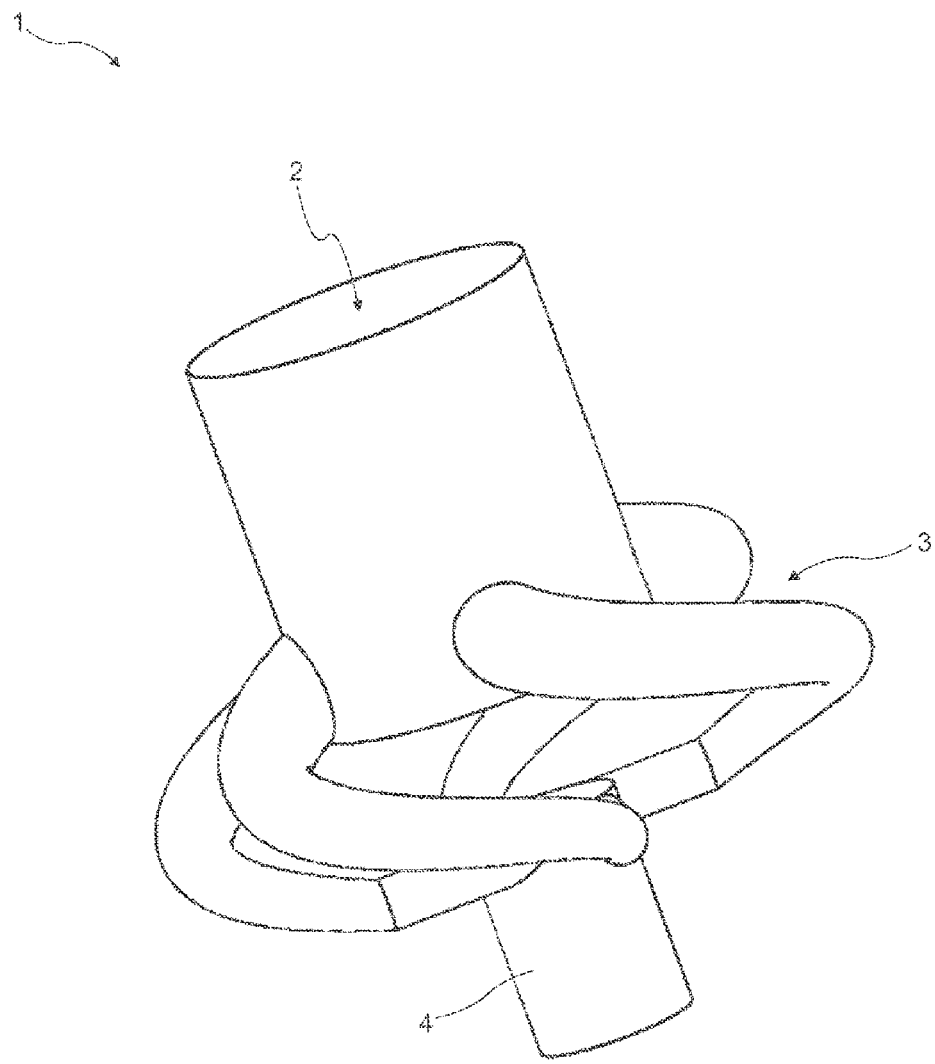
Figure 3:
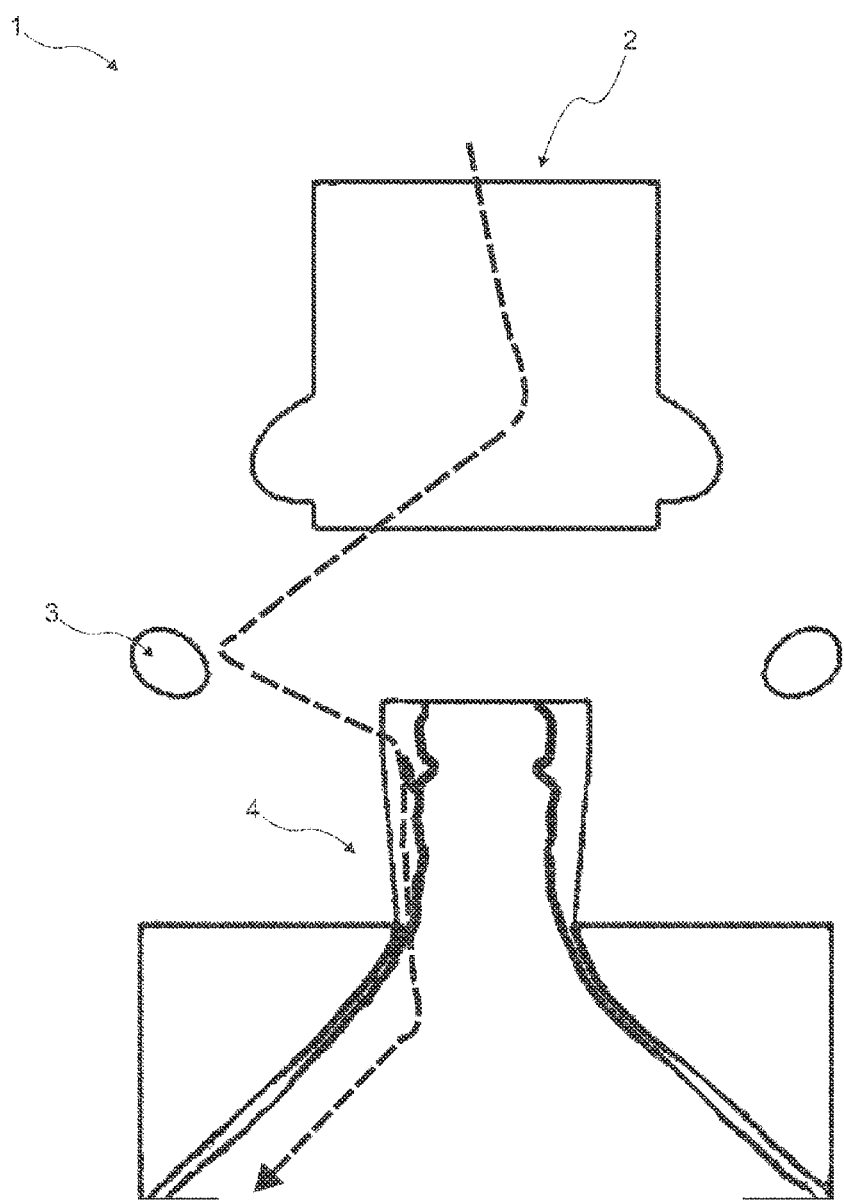

(58) Field of Classification Search
CPC ............ F01N 2610/02; F01N 2610/03; F01N 2610/14; F01N 3/208; F01N 3/36; Y02T 10/12; F02M 61/162
See application file for complete search history.

(56) References Cited

U.S. PATENT DOCUMENTS

| | | |
|---|---|---|
| 2005/0224602 A1* | 10/2005 | Foubert ................. B05B 1/3421 239/463 |
| 2009/0158743 A1* | 6/2009 | Francis ................... F23R 3/286 60/748 |
| 2011/0303767 A1 | 12/2011 | Smith |
| 2013/0146680 A1 | 6/2013 | Shivaram et al. |
| 2016/0223201 A1* | 8/2016 | Zink ........................ F23D 11/10 |
| 2017/0191457 A1 | 7/2017 | Spivey et al. |
| 2019/0376690 A1* | 12/2019 | Niemeyer ............... F23R 3/286 |

FOREIGN PATENT DOCUMENTS

| | | |
|---|---|---|
| EP | 1090256 B1 | 8/2005 |
| EP | 2072780 A2 | 6/2009 |
| WO | 2005005053 A1 | 1/2005 |

* cited by examiner

FLUID ATOMIZER WITH HELICAL INLET CHANNEL

CROSS REFERENCE TO THE RELATED APPLICATIONS

This application is the national phase entry of International Application No. PCT/TR2021/050370, filed on Apr. 21, 2021, which is based upon and claims priority to Turkish Patent Application No. 2020/06305, filed on Apr. 21, 2020, the entire contents of which are incorporated herein by reference.

TECHNICAL FIELD

The present invention relates to a fluid atomizer with helical inlet channel which is a pressure swirl atomizer that is used to atomize liquid fuel or fluid and transform the same into a spray consisting of droplets, provides a homogeneous spray dispersion that receives the flow fed from the center and gives it back to the center by forming a swirl.

BACKGROUND

Atomizers are used to atomize the liquid into a spray of droplets. Sprays are used in many technological and ready-made products such as internal combustion engines, jet engines, rocket engines, exhaust systems of cars, painting systems, surface coatings, pharmaceutical applications, perfume applications. Pressure swirl atomizers create a hollow conical fluid film at the exit of the atomizer and then a hollow conical spray with the atomizing of this film by pushing the fluid inside and outside the atomizer from the center outwards with the swirl they create in the swirl chamber.

In standard pressure swirl atomizers, the center of the spray formed as a single cone is empty and particularly in coating and high flow spray applications, it does not have homogenous droplet dispersion in the volume or surface where it is applied. Jet atomizers are used for full homogeneous sprays, but these atomizers require high levels of upstream pressure at high flow rates. At the same pressure, pressure swirl atomizers produce a spray of smaller droplets. In short, at high flow rates, there is a requirement for an atomizer that increases the angular homogeneity relative to the symmetry axis of the atomizer and keeps the pressure requirement low, but also generates small drops.

In fluid atomizers used in the state of the art, although the inlet channels enter the swirl chamber tangentially or at a certain angle, the fluid becomes irregular while it enters the inlet channels, thus it causes high energy losses and cavitation. Together with the flow irregularity, non-homogeneous and spray with larger-drops is formed. Such condition is an important technical problem known in the state of the art and it causes efficiency reduction in applications where spray has to be generated, such as combustion irregularity, even complete or no combustion in engines or, nonhomogeneous coating in coating processes. In critical applications beyond reduction of efficiency, these effects can cause for example shorter part or system life than expected, or complete loss of function and thus fatal accidents.

Jet type atomizers (sprayer, atomizer) pass less flow rate at the same pressure. Meanwhile, the drop size in jet type atomizers is larger compared to the pressure swirl atomizers at the same fluid flow rate. When the spray is preferred to be produced in a more homogenous manner, jet type atomizers that require more pressure and produce large drops are required. In the state of the art, also atomizers incorporating gas flow are used in which gas (preferably air) is directed immediately onto the film exiting the atomizer to reduce the droplets. However, this situation causes the atomizer systems to become more complex.

There are many atomizer models in the pressure swirl atomizer category. The most necessary technical characteristic for allowing these atomizers to operate properly is that they create swirl by transmitting the flow through the inlet channels to the swirl chamber properly. Atomizers are usually consisting of two or more parts in order to do this in a narrow volume (5-10 mm3 in aircraft and car engine applications). The parts are required to be concentric in multi-part designs, thus this requires very low manufacturing tolerances, which increases the cost per atomizer. Due to the flow irregularities they create in the internal flow, too much pressure loss is experienced in the desired flow rate and they cannot have the desired drop distribution and homogeneity in many multi-part atomizers.

In the United States document numbered US2013146680 (A1) having priority date Dec. 9, 2011 included in the state of the art, an invention is described to mix powder fuel with gas, intended for use in iron smelting furnaces. In said document, powder fuel was supplied from the center, and flammable gas was supplied through straight and helical channels. The present invention is not intended to create a spray and is based on adjusting the swirl ratio. The atomizer subject to application has a different structure; the flow is carried by helical channels between two independent chambers. The helical channels described in the application and the way they provide connection between said two independent flow chambers are different compared to existing applications.

In the United States document numbered US2017191457 (A1) having priority date Jan 5, 2016 in the state of the art, the injector body design and a fuel mixer part in this injector are described. Helical forms are formed on the mixer so as to transfer the fuel to the mixing chamber by rotating. In said invention, the flow enters tangentially, and in the present invention subject to application, the flow makes a 90° turn and enters. Each channel makes a 30° turn according to the figures of that United States patent document the rotation angle of flow is more than 30° in the invention subject to application, the greater the angle, the better leaning of the flow to the external wall. Moreover, in said United States patent document, it is aimed to use the swirl chamber for liquid fuel and the entire injector for liquid and gas fuel together. In said patent document, liquid fuel is not received from the center and is not injected into the center. That is to say, it is not possible to use it as an insert with the solenoid actuator. In the invention subject to application, a single-part atomizer is used, there are two independent flow chambers in the atomizer, the flow is allowed to enter from one chamber to another tangentially or at a different angle. In the invention subject to application, the flow is carried between 30-90 degrees from one chamber to another. The fluid inlet and transfer into the helical inlet channels in said angle range provides better leaning of the flow to the external wall. Moreover, it is aimed to use liquid and gaseous fuels together in all injectors for liquid fuels.

In the Chinese patent document numbered CN205495878 (A) having priority date Mar. 14, 2016 in the state of the art, a multi-part atomizer is disclosed. Pressurized air and fuel are fed into the system, are mixed and transferred to the combustion chamber. The mixing helical forms added to the injector edge area are used so as to form a better mixture. In said document, a helical form is used for fuel feeding and a multi-part fluid atomizer is disclosed. The atomizer subject to application has a completely different structure; the flow is carried by helical channels between two independent chambers. Two independent flow chambers described in the application and the connection of these chambers to each other by means of helical channels are different compared to existing applications.

The fluid atomizers disclosed in the application are characterized as new type pressure fluid atomizers. In the fluid atomizer of said invention, the fluid inlet that is spirally designed is used. In the fluid atomizer of the present invention, the pipes are narrowed and enter the swirl chamber tangentially or at an angle. In said invention, there is a single piece, compact design. The fluid in the invention subject to application begins to rotate in the helical channels before the liquid enters the swirl chamber; it forms a homogeneous spray at high flow and low pressure by being exposed to lesser energy losses in the swirl chamber.

In the state of the art, there is no explanation regarding the technical features and the technical effects provided by the invention of the present application. In existing applications, there is no fluid atomizer which has helical inlet channels, uses a helically designed fluid inlet, allows the pipes to enter the swirl chamber at a tangential or angular angle, has a monolithic design, and provides homogeneous spray application at high flow and low pressure.

SUMMARY

The aim of the present invention is to provide a fluid atomizer with helical inlet channel that leads to lower pressure loss at a constant flow rate, provides an improved internal flow and a better spray distribution.

Another aim of the invention is to provide a fluid atomizer with helical inlet channel that designs the internal flow improvement helically, provides this with inlet channels tangentially entering the swirl chamber by narrowing in the flow direction.

Another aim of the invention is to provide a fluid atomizer with a helical inlet channel where the flow coming centrally from the main inlet can enter the swirl chamber with minimal energy loss (pressure drop).

Another aim of the present invention is to provide a fluid atomizer with a helical inlet channel that provides homogeneous spray application at high flow and low pressure.

Another aim of the present invention is to provide a fluid atomizer with a helical inlet channel used in chemical reaction applications where the atomizers used in aircraft and rocket injectors, cooling and paint/coating systems, in other words, homogeneous distribution and mixing of spray liquid with ambient gas are important.

As defined in the first claim and the other dependent claims, in order to achieve the aim of this invention, fluid atomizer with helical inlet channel consists of a fluid inlet helical inlet channel, swirl chamber and fluid outlet. The fluid atomizer has a single centerline for fluid inlet. First of all, the fluid is transferred from the fluid inlet in a pressurized form. There is a plurality of helical inlet channels (3) at the lower part of the fluid inlet. Helical inlet channels are located at different angles and distances to each other. Helical inlet channels are connected to the swirl chamber helically. The fluid that enters through the fluid inlet with high pressure passes through the helical inlet openings of the helical inlet channels. The helical inlet openings allow the fluid to flow into the flow chamber tangentially or at a preferred angle so as to form a swirl. The helical inlet openings that allow the fluid to flow into the flow chamber at a tangential or preferred angle so as to form a swirl can be configured tangentially or at a preferred angle. Fluid that exits from the helical inlet channels is transferred to the swirl chamber. The fluid that enters the swirl chamber forms a swirl in the center of the swirl chamber. When the fluid in the swirl chamber achieves a sufficient swirl characteristic (regular and rotation speed around the central axis of the atomizer), air flow occurs into the swirl chamber and the fluid outlet. The fluid that achieves the swirl characteristic in the swirl chamber is directed towards the fluid outlet. In case the swirl chamber has a narrowing conical structure or is smaller in diameter than the fluid inlet, the flow and rotation speed of the fluid in the swirl chamber increases. The fluid in the swirl chamber rotates after it enters through the helical inlet channels with pressure and forms a swirl. Low pressure is formed due to the rotation of the fluid in the swirl chamber. The air is sucked from the outside and through the fluid outlet depending on the low pressure formed. In case the air is sucked through the fluid outlet, a fluid is formed on the external wall of the fluid outlet and the swirl chamber, and an air layer is formed on the inner wall. At the same time, the fluid entering the swirl chamber through the created low pressure region can turn back and exit from the fluid outlet. The fluid which flows by rotating in the swirl chamber rotates about the central axis of the atomizer and exits through the fluid outlet in the form of conical film layer or atomized droplets. The liquid that comes out in the form of a conical film atomizes immediately after the outlet and forms the spray.

BRIEF DESCRIPTION OF THE DRAWINGS

Fluid atomizer with helical inlet channel that is realized for reaching the aim of this invention is illustrated in the accompanying figures, in which;

FIG. 1 is a perspective view of the fluid atomizer with helical inlet channel.

FIG. 2 is a perspective view of the fluid atomizer with helical inlet channel from another angle.

FIG. 3 is a schematic view of the flow process that shows the cone spray dispersion in the fluid atomizer.

The parts in the figure are enumerated one by one and the parts correspond to these numbers are given in the following.

1. Fluid atomizer
2. Fluid inlet
3. Helical inlet channel
  3.1. Helical inlet opening
  3.2. Helical outlet opening
  3.3. Flow path
4. Swirl chamber
5. Fluid outlet

DETAILED DESCRIPTION OF THE EMBODIMENTS

A fluid atomizer (1) with helical inlet channel which is used to atomize the fluid and convert the same into a spray of droplets, contains fluid inlet (2) which are two independent chambers through which the flow passes and swirl chamber (4) transforms the fluid into spray dispersion by atomizing the same after the fluid is collected in the center after centrally coming fluid is dispersed by forming a swirl, mainly includes the following;

at least one fluid inlet (2) that allows the fluid coming from the main fluid line to be transferred to the helical inlet channels (3) and the swirl chamber (4) to be transformed into spray form, a plurality of helical inlet channels (3) that are located on the fluid inlet (2), extends from the fluid inlet (2) towards the swirl chamber (4) helically, allows the fluid accumulated at the fluid inlet (2) to be atomized and transferred to the swirl chamber (4) through a plurality of channels, provides to receive the fluid from the center of the fluid inlet (2) and to access the swirl chamber (4) at a tangential or preferred angle with swirl property, at least one swirl chamber (4) which is connected to helical inlet channels (3) and has circular form, causes the fluid to enter the fluid inlet (2) at a tangential or preferred angle to create a swirl and directs the swirling fluid to the fluid outlet (5), can change the rotation speed and flow rate of the fluid coming from the helical inlet channels (3) in the helical swirl flow characteristic by its geometric form, at least one fluid outlet (5) which is located at the lower end of the swirl chamber (4), can suck air therein due to the characteristic of the flow inside and the pressure difference with the external environment, provides the outlet of the fluid in the form of conical fluid film or in the form of conical spray by atomizing the droplets with the air it sucks therein.

The invented fluid atomizer (1) is generally used in many technological and ready-made products such as internal combustion engines, jet engines, rocket engines, exhaust gas cleaning systems of cars, painting systems, surface coatings, pharmaceutical applications, perfume applications etc. Specifically, the fluid atomizers (1) can be used in the fuel systems of internal combustion engines or in the exhaust systems. Fluid atomizers (1) can be used in the fuel systems of internal combustion engines or in the exhaust systems so as to burn the fuel better. The fluid atomizer (1) allows the fuel or additives to be mixed into the fuel in the fuel systems or exhaust systems of internal combustion engines to be sprayed to the preferred area in the form of spray. Mixing becomes much more effective and the efficiency of the combustion or mixing process increases depending on the field of use, by spraying the fuel or additive in liquid form to the preferred area in the form of a spray.

In another embodiment of the invention, the fluid atomizers (1) can be used to allow the exhaust emission value to reach the preferred levels in the exhaust systems of internal combustion engines. Fluid similar to Adblue which provides the combustion in the gas exiting the exhaust system or the reduction of the exhaust gas by reacting again before it is discharged, can be sprayed with the fluid atomizer (1).

The fluid atomizer (1) preferably includes the fluid inlet (2), the helical inlet channel (3), the swirl chamber (4) and the fluid outlet (5). Fluid atomizer (1) is used to atomize the liquid into a spray consisting of droplets. The fluid atomizer (1) enables the fluid coming in liquid form from the fluid inlet (2) to move in the swirl characteristic and forms a film on the wall of the swirl chamber by sucking gas (air) from the fluid outlet into the swirl chamber (4). This film exits the fluid outlet (5) by forming a hollow conical liquid film or it is atomized in the swirl chamber and exits as a hollow conical spray. In case the fluid exits the outlet (5) as a hollow conical liquid, it is atomized at a close distance to the atomizer, forming a hollow conical spray.

The fluid inlet (2) included in an embodiment of the invention allows the fluid coming from the main fluid line to be transferred to the helical inlet channels (3) and the swirl chamber (4) to be transformed into spray form. The fluid inlet (2) can preferably be in different geometrical forms. The fluid inlet (2) provides that the fluid coming from the main fluid line is collected in a single center. One end of the fluid inlet (2) is connected to the main fluid line and the other end is connected to the helical inlet channels (3). The helical inlet channels (3) are located on the cylindrical surface of the fluid inlet (2).

In an embodiment of the invention, the helical inlet channel (3) is located on the fluid inlet (2). The helical inlet channel (3) extends downward from the inner section of the fluid inlet (2) in a helical form. The helical inlet channel (3) ensures that the fluid accumulated at the fluid inlet (2) is separated into a plurality of sections and transferred into the swirl chamber (4). The helical inlet channel (3) ensures that the fluid is received from the center of the fluid inlet (2) and enters into the swirl chamber (4) at a tangential or preferred angle. There is a plurality of helical inlet channels (3) at the lower end of the cylindrical surface of the fluid inlet (2). The helical inlet channels (3) can be positioned with spaces at different angle intervals to each other. The helical inlet channels (3) provide the connection between the fluid inlet (2) and the swirl chamber (4) in a manner such that they have helical form. At the same time, the helical inlet channels (3) provide that by transferring the fluid transferred from the center of the fluid inlet (2) to the swirl chamber (4), the fluid coming from a single center exits from the fluid outlet (5) by being collected again in a separate area on the same central axis. The helical inlet channel (3) provides the passage of the fluid between two independent chambers, fluid inlet (2) and the swirl chamber (4). At the same time, it also provides that the flow enters the swirl chamber (4) from the fluid inlet (2), which is one of the chambers, at the desired swirl characteristic, movement and speed. The helical inlet channel (3) includes the helical inlet opening (3.1). The helical inlet channel (3) ensures the fluid to be converted into spray form to enter into the swirl chamber (4) at a tangential or preferred angle. The helical inlet channel (4) is connected to the swirl chamber (3). A plurality of helical inlet channels (3) is connected to the swirl chamber (4). In this embodiment of the invention, four helical inlet channels (2) are connected to the swirl chamber (4). The helical inlet channels (3) are in a preferred angle range in the swirl chamber (4). In this embodiment of the present invention, there is a 90 degree angle between the helical inlet channels (3). The fluid enters from the helical inlet channel (3) in a pressurized manner since the fluid entering the helical inlet channel (3) from the fluid inlet (2) passes from a wide area to a narrow area.

In an embodiment of the invention, the helical inlet channel (3) consists of helical inlet opening (3.1), helical outlet opening (3.2) and flow path (3.3).

The helical inlet opening (3.1) located in the helical inlet channel (3) is located at the section where the helical inlet channels (3) engage with the fluid inlet (2), The connection of the helical inlet channel (3) to the swirl chamber (4) is realized with the helical outlet opening (3.2). There is a flow path (3.3) forming the path followed by the fluid between the helical inlet opening (3.1) and the helical outlet opening (3.2).

The helical outlet openings (3.2) allow the fluid entering through the helical inlet channels (3) to enter the swirl chamber (4) at a tangential or preferred angle. Helical inlet opening (3.1) is configured so as to allow the fluid to enter the swirl chamber (4) at a tangential or preferred angle; the helical outlet opening (3.2) is configured to be connected to the swirl chamber (4) and the fluid inlet (2) at a tangential or preferred angle. The fluid that enters the helical inlet channels (3) from the helical inlet opening (3.1) moves along the flow path (3.3) and enters the swirl chamber (4) through the helical outlet opening (3.2). In this case, the swirling of the fluid entering the helical inlet channel (3) and exiting from the helical inlet channel (3) can be triggered downstream of the helical outlet openings (3.2) by means of opening the helical inlet openings (3.1) in the helical inlet channels (3), which are spaced at different angles to each other, to the helical inlet channels (3) at a tangential or preferred angle, opening the helical outlet openings (3.2) to the swirl chamber (4) at a tangential or preferred angle. The helical inlet channel (3) ensures that the fluid coming from the fluid inlet (2) is atomized and transferred to the fluid outlet (5). The helical inlet channels (3) are located between the fluid inlet (2) and the swirl chamber (4). The dimensions and diameter of the helical inlet channels (3) can be configured to create a preferred amount of swirl flow characteristic. The helical inlet channels (3) are in different geometric forms and can be configured to trigger swirl formation. In an embodiment of the invention, the helical inlet channels (3) are in C or S geometric form and one end with a helical inlet opening (3.1) is connected to the fluid inlet (2) and the other end with a helical outlet opening (3.2) is connected to the swirl chamber (4). The properties of the swirl flow characteristic of the fluid can be changed with different geometric forms of the helical inlet channels (3).

In a different embodiment of the invention, the flow characteristics can be changed with the length and form of the helical inlet channel (3). When the length of the helical inlet channel (3) becomes longer, the fluid stays more in the channel and some controls such as flow rate and temperature of the fluid can be carried out with the movement in the channel.

Moreover, it is possible to create swirl flow in different volumes and speeds in the helical inlet channels (3) and in the swirl chamber (4) by changing the diameter of the helical inlet (3.1) and the helical outlet opening (3.2) in the helical inlet channels (3). The flow rate of the fluid can be reduced and the period velocity of the swirl can be increased, in case of reducing the diameter of the helical inlet opening (3.1) and the helical outlet opening (3.2) at a constant pressure. The flow rate of the fluid can be increased and the period velocity of the swirl can be reduced, in case of increasing the diameter of the helical inlet opening (3.1) and the helical outlet opening (3.2). The helical inlet channels (3) can change the flow rate of the fluid entering from the helical inlet opening (3.1) at a constant pressure. It is provided to reduce the flow rate from the fluid inlet (2) if the diameters of the helical inlet openings (3.1) are small. It is provided to increase the flow rate from the fluid inlet (2) if the diameters of the helical inlet openings (3.1) are large. The helical inlet channels (3) trigger atomizing the fluid coming from the fluid inlet (2) and its separation in a plurality of channels.

In one embodiment of the invention, the helical outlet opening (3.2) located in the helical inlet channel (3) is located at the section where the helical inlet channels (3) engage with the swirl chamber (4). There is a flow path (3.3) forming the path followed by the fluid between the helical inlet opening (3.1) and the helical outlet opening (3.2). The helical outlet openings (3.2) allow the fluid entering through the helical inlet channels (3) to enter the swirl chamber (4) at a tangential or preferred angle. The helical outlet opening (3.2) is configured to be connected to the swirl chamber (4) and the fluid inlet (2) at a tangential or preferred angle so as to allow the fluid to enter the swirl chamber (4) at a tangential or preferred angle. The fluid that enters the helical inlet channels (3) from the helical inlet opening (3.1) moves along the flow path (3.3) and enters the swirl chamber (4) through the helical outlet opening (3.2). In this case, the swirling of the fluid entering the helical inlet channel (3) and exiting from the helical inlet channel (3) can be triggered downstream of the helical outlet openings (3.2) by means of opening the helical inlet openings (3.1) in the helical inlet channels (3), which are spaced at different angles to each other, to the helical inlet channels (3) at a tangential or preferred angle, opening the helical outlet openings (3.2) to the swirl chamber (4) at a tangential or preferred angle.

The parameters such as flow velocity distribution, flow structures, pressure, laminar or turbulent flow, cavitation etc. can be controlled by changing the geometric form of the helical inlet channels (3).

In an embodiment of the invention, the flow path (3.3) located in the helical inlet channel (3) is located between the helical inlet opening (3.1) and the helical outlet opening (3.2). The different geometrical forms of the helical inlet channels (3) vary depending on the geometric form of the flow path (3.3). The fluid that enters the helical inlet channels (3) from the helical inlet opening (3.1) moves along the flow path (3.3) and enters the swirl chamber (4) through the helical outlet opening (3.2). The helical inlet channel (3) flow path (3.3) can be helical or in different geometric forms such as C or S. The properties of the swirl flow characteristic of the fluid can be changed with different geometric forms of the flow path (3.3). In a preferred embodiment of the invention, the flow path (3.3) of each helical inlet channel (3) is in the same geometric form. In the alternative embodiments of the invention, the flow path (3.3) of each helical inlet channel (3) can be in different geometrical form and thus flows having different swirl characteristics can be obtained in the swirl chamber.

The swirl chamber (4) in one embodiment of the present invention is located at the lower section of the helical inlet channels (3). There are helical inlet channels (3) at one end of the swirl chamber (4) and fluid outlet (5) at the other end. The swirl chamber (4) is in circular form. The swirl chamber (4) allows the fluid to exit the helical outlet opening (3.2) at a tangential or preferred angle to form a swirl. The swirl chamber (4) orients the swirl forming fluid to the fluid outlet (5). The swirl chamber (4) increases the rotation speed and flow speed of the fluid coming from the helical inlet channels (3) with the helical swirl flow characteristic. The swirl chamber (4) is preferably in a circular or cylindrical form. In a different embodiment of the present invention, the swirl chamber (4) can be in the form of a narrowing and expanding conical shape. The swirl chamber (4) orients the swirl forming fluid to the fluid outlet (5). In this embodiment of the invention, the swirl chamber (4) is preferably in a cylindrical geometric form, there are helical inlet channels (3) at one end of the cylindrical surface and fluid outlet (5) at the other end. Fluid that enters through the helical inlet channels (3) with high pressure passes through the helical inlet openings (3.1) and exits from the helical outlet opening (3.2) in the helical flow characteristic and then passes to the swirl chamber (4). The fluid that comes from the helical inlet channels (3) creates a swirl to rotate around the central axis of the swirl chamber (4). The diameter of the swirl chamber (4) is preferably smaller than the diameter of the fluid inlet (2).

In an embodiment of the present invention, the swirl chamber (4) has a conical shape that narrows towards the fluid outlet (5) or a geometric form with diameters narrowing towards the fluid outlet (5). In this embodiment of the present invention, the swirl chamber (4) is preferably in a conical geometric form. The speed of the fluid coming from the helical inlet channels (3) can be increased in the swirl chamber (4) due to the conical shape of the swirl chamber (4), further, the pressure of the fluid decreases and the rotation speed of the swirl increases due to the decrease in diameter.

In an embodiment of the present invention, the swirl chamber (4) has a conical shape that extends towards the fluid outlet (5) or a geometric form with diameters that widen towards the outlet. In this embodiment of the present invention, the swirl chamber (4) is preferably in a conical geometric form. The speed of the fluid coming from the helical inlet channels (3) can be decreased in the swirl chamber (4) due to the expanding conical shape of the swirl chamber (4), further, the pressure of the fluid increases and film layer becomes thicker due to the increase in diameter. The angle of the hollow conical liquid film or spray exiting the fluid outlet (5) is controlled with this application.

The fluid outlet (5) in one embodiment of the present invention is located at the lower end of the swirl chamber (4). The fluid outlet (5) transfers the fluid with swirl characteristic to the external environment by sucking the air coming from the external environment, provides the discharge of the fluid with a conical film spray form to the application area. The fluid outlet (5) opens to the external environment or to an operating system (fuel system, exhaust system, etc.) to which the fluid outlet (5) can be connected.

The fluid outlet (5) in one embodiment of the present invention is located at the lower end of the swirl chamber (4). The fluid outlet (5) may be a cylindrical channel of fixed diameter of a certain length. The fluid outlet (5) transfers the fluid with swirl characteristic to the external environment by sucking the air coming from the external environment, provides the discharge of the fluid with a conical film spray form to the application area. The fluid outlet (5) opens to the external environment or to an operating system (fuel system, exhaust system, etc.) to which the fluid outlet (5) can be connected.

The fluid outlet (5) in one embodiment of the present invention is located at the lower end of the swirl chamber (4). The fluid outlet (5) may be a channel with a certain length that has an increasing diameter towards the outside. The fluid outlet (5) transfers the fluid with swirl characteristic to the external environment by sucking the air coming from the external environment, provides the discharge of the fluid with a conical film spray form to the application area. The fluid outlet (5) opens to the external environment or to an operating system (fuel system, exhaust system, etc.) to which the fluid outlet (5) can be connected.

The fluid outlet (5) in one embodiment of the present invention is located at the lower end of the swirl chamber (4). The fluid outlet (5) may be a channel with a certain length that has a decreasing diameter towards the outside. The fluid outlet (5) transfers the fluid with swirl characteristic to the external environment by sucking the air coming from the external environment, provides the discharge of the fluid with a conical film spray form to the application area. The fluid outlet (5) opens to the external environment or to an operating system (fuel system, exhaust system, etc.) to which the fluid outlet (5) can be connected.

Usage of fluid atomizer (1) included in one embodiment of the invention is realized as the following. There is a single centerline for fluid inlet (2) in the fluid atomizer (1). First of all, the fluid is transferred from the fluid inlet (2) in a pressurized form. There is a plurality of helical inlet channels (3) at the lower part of the fluid inlet (2). Helical inlet channels (3) are located at different angles and distances to each other. Helical inlet channels (3) are connected to the swirl chamber (4) helically. The fluid that enters through the fluid inlet (2) with high pressure passes through the helical inlet openings (3.1) of the helical inlet channels (3). The helical inlet openings (3.1) can be configured at a tangential or preferred angle so as to allow the fluid to create a swirl and to enter the helical inlet channels (3) at a tangential or preferred angle. The fluid that passes through the helical inlet opening (3.1) are transferred from the helical outlet opening (3.2) to the swirl chamber (4) in the helical form of the helical inlet channel (3) by following the flow path (3.3), The pressure of the fluid that enters the swirl chamber (4) reduces due to the high velocity cycle of the swirl. When the pressure reduces below a certain amount of the pressure of the external environment, gas (air) is sucked from the external environment. The fluid that enters the swirl chamber (4) while continues to rotate in the swirl chamber (4), creates a swirl in the center of the swirl chamber (4). The fluid in the swirl chamber (4) exits the fluid outlet (5) after making swirl movement for a while. The fluid that achieves the swirl characteristic in the swirl chamber (4) is directed towards the fluid outlet (5). In case the swirl chamber (4) has a narrowing conical structure or is smaller in diameter than the fluid inlet, (2) the flow and rotation speed of the fluid in the swirl chamber (4) increases. The fluid in the swirl chamber (4) rotates after it enters through the helical inlet channels (3) with pressure and forms a swirl. Low pressure is formed due to the rotation of the fluid in the swirl chamber (4). The air is sucked from the outside and through the fluid outlet (5) depending on the low pressure formed. The gas (air) sucked from the fluid outlet (5) pushes the fluid towards the outer wall of the fluid outlet (5). When the air is sucked through the fluid outlet (5), a fluid is formed on the external wall of the fluid outlet (5) and the swirl chamber (4), and an air layer is formed on the inner wall. At the same time, the fluid entering the swirl chamber (4) through the created low pressure region can turn back and exit from the fluid outlet (5). The fluid which flows by rotating in the swirl chamber (4) rotates about the central axis of the atomizer (1) and exits through the fluid outlet (5) in the form of conical film layer or atomized droplets. If the liquid occurs as a conical film layer, it is atomized close to the atomizer, creating a hollow conical spray.

What is claimed is:

1. A fluid atomizer with a plurality of helical inlet channels, wherein the fluid atomizer is configured to atomize a fluid and convert the fluid into a spray of droplets, the fluid atomizer comprises a fluid inlet and a swirl chamber, wherein the fluid inlet and the swirl chamber are two independent chambers, and a flow passes through the two independent chambers, the fluid atomizer transforms the fluid into a spray dispersion by atomizing the fluid after the fluid is collected in a center of the fluid inlet after a centrally coming fluid is dispersed by forming a swirl, wherein the fluid inlet allows the fluid to be transformed into a spray form, wherein the fluid comes from a main fluid line and is to be transferred to the helical inlet channels and the swirl chamber, the plurality of helical inlet channels are located on the fluid inlet, the plurality of helical inlet channels extends from the fluid inlet towards the swirl chamber helically, the plurality of helical inlet channels allows the fluid accumulated at the fluid inlet to be atomized and transferred to the swirl chamber through the plurality of helical inlet channels, the plurality of helical inlet channels provides to receive the fluid from the center of the fluid inlet and to access the swirl chamber at a tangential or predetermined angle with a swirl property, the swirl chamber is connected to the plurality of helical inlet channels and has a circular form, the swirl chamber causes the fluid to enter from the fluid inlet at a tangential or predetermined angle to create a swirl and directs the swirling fluid to a fluid outlet, the swirl chamber can change a rotation speed and flow speed of the fluid coming from the plurality of helical inlet channels in a helical swirl flow characteristic by a geometric form of the swirl chamber and plurality of helical inlet channels, wherein, at connections between the plurality of helical inlet channels and the swirl chamber, the plurality of helical inlet channels are aligned with a plane that is perpendicular to a central axis of the circular form of the swirl chamber, the fluid outlet is located at a lower end of the swirl chamber, the fluid outlet can suck air in the swirl chamber due to a characteristic of the flow inside and a pressure difference with an external environment, the fluid outlet provides an outlet of the fluid in a form of conical fluid film or in a form of conical spray form by atomizing the droplets with the air, wherein the fluid outlet sucks the air.

2. The fluid atomizer according to claim 1, wherein a first end of the fluid inlet is connected to the main fluid line and a second end of the fluid inlet is connected to the helical inlet channels and allows the fluid coming from the main fluid line to be collected in a single center.

3. The fluid atomizer according to claim 1, wherein the helical inlet channels comprise a helical inlet opening, the helical inlet channels are placed at different angles to each other with a gap between the helical inlet channels and connect the fluid inlet and the swirl chamber to form a helical shape.

4. The fluid atomizer according to claim 1, wherein each of the helical inlet channels provides the fluid to exit from the fluid outlet by gathering the fluid coming from a single center on the same center axis in a separate area by transferring the fluid transferred from the center of the fluid inlet to the swirl chamber.

5. The fluid atomizer according to claim 1, wherein each of the helical inlet channels provides a passage of the fluid between the two independent chambers, the fluid inlet and the swirl chamber and allows the fluid to enter the swirl chamber from the fluid inlet, with a predetermined swirl characteristic, movement and velocity.

6. The fluid atomizer according to claim 1, wherein each of the helical inlet channel comprises a helical inlet opening, a helical outlet opening and a flow path, each of the helical inlet channel enables the fluid to be converted to the spray form to enter the swirl chamber at a tangential or predetermined angle;

the helical inlet opening is located at a junction of the helical inlet channels with the fluid inlet, and the helical inlet opening forms a path followed by the fluid between the helical outlet opening and the flow path with a helical form;

the helical inlet opening is configured to be connected to the helical outlet opening, the swirl chamber and the fluid inlet at a tangential or predetermined angle to allow the fluid to enter the swirl chamber at a tangential or predetermined angle;

the helical inlet opening enables the fluid entering the helical inlet channels to enter the swirl chamber from the helical outlet opening by moving along the flow path.

7. The fluid atomizer according to claim 1, wherein each of the helical inlet channels is located between the fluid inlet and the swirl chamber, the helical inlet channels allows the fluid coming from the fluid inlet to be divided and transferred to the fluid outlet and a diameters of the helical inlet channels are configured to create a swirl flow characteristic of a predetermined size.

8. The fluid atomizer according to claim 1, wherein each given helical inlet channel of the helical inlet channels is in a helical or C or S geometric form and a first end of the given helical inlet channel with a helical inlet opening is connected to the fluid inlet and a second end of the given helical inlet channel with a helical outlet opening is connected to the swirl chamber, a flow path of the given helical inlet channel is helical or C or S geometric shaped to allow the fluid to move in the helical flow characteristic.

9. The fluid atomizer according to claim 3, wherein the helical inlet channels enable a swirl flow at different speeds in the helical inlet channels and in the swirl chamber by changing a diameter of the helical inlet opening and the helical outlet opening;

wherein the helical inlet channels are configured to increase the rotation speed of the fluid around the center in a form of swirl when diameter dimensions of the helical inlet opening and the helical outlet opening are reduced; or the helical inlet channel are configured to reduce the rotation speed around the center in case the diameter dimensions of the helical inlet opening and the helical outlet opening are increased.

10. The fluid atomizer according to claim 1, wherein the helical inlet channels allows a pressure of the fluid entering at a high pressure from the fluid inlet to decrease in case a diameter of the helical inlet openings of the helical inlet channels is small.

11. The fluid atomizer according to claim 1, wherein the helical inlet channels allow a pressure of the fluid entering at a high pressure from the fluid inlet to decrease at a lower rate if a diameter of helical inlet openings of the helical inlet channels is large.

12. The fluid atomizer according to claim 1, wherein the helical inlet channels provide the flow rate of the fluid to decrease at a constant pressure from the fluid inlet in case a diameter of helical inlet openings of the helical inlet channels is small.

13. The fluid atomizer according to claim 1, wherein the helical inlet channels increase the flow rate of the fluid at a constant pressure from the fluid inlet in case a diameter of helical inlet openings of the helical inlet channels is large.

14. The fluid atomizer according to claim 1, wherein the helical inlet channels allow the fluid with a low flow velocity at a high pressure from the fluid inlet to pass through the swirl chamber, wherein the swirl chamber has a smaller diameter than the fluid inlet.

15. The fluid atomizer according to claim 1, wherein the helical inlet channels allow the fluid with a low flow velocity at a high pressure from the fluid inlet to pass through the swirl chamber.

16. The fluid atomizer according to claim 1, wherein the helical inlet channels allow the fluid with a low flow velocity at a high pressure from the fluid inlet to pass through the swirl chamber of the same diameter as the fluid inlet and the fluid outlet by being divided.

17. The fluid atomizer according to claim 6, wherein a helical outlet opening allows the fluid entering through the helical inlet channels to enter the swirl chamber at a tangential or predetermined angle.

18. The fluid atomizer according to claim 1, wherein the swirl chamber allows the fluid to exit a helical outlet opening at a tangential or predetermined angle to form a swirl and directs the swirling fluid to the fluid outlet.

19. The fluid atomizer according to claim 1, wherein the swirl chamber increases the rotation speed and flow rate of the fluid coming from the helical inlet channels with the helical swirl flow characteristic.

20. The fluid atomizer according to claim 1, wherein the fluid outlet starts from an inside of the swirl chamber and extends downwards and allows the fluid to be transferred to the external environment to exit in a form of conical film or spray by sucking air coming from the external environment.

* * * * *